United States Patent Office 2,860,038
Patented Nov. 11, 1958

2,860,038

PROCESS FOR SEPARATING ZINC CHLORIDE FROM ZINC SULFATE

Leo Garwin, Oklahoma City, Okla., and James M. Winterbottom, Midland, Mich., assignors of ten percent to James D. Wolfe, Edmond, Okla.

No Drawing. Application June 9, 1955
Serial No. 514,368

16 Claims. (Cl. 23—299)

This invention relates to improvements in the process of separating zinc chloride from other zinc salts, particularly zinc sulfate.

Zinc sulfate, as used in the rayon industry or for the manufacture of lithopone, is required to be substantially free of zinc chloride. An improved process for purifying zinc sulfate by removal of zinc chloride would thus be of considerable importance. Such a process would also be useful for the preparation of analytical grade zinc chloride, zinc sulfate, and related zinc compounds.

We have discovered that zinc chloride can be extracted with furfural from a solution containing zinc salts to give a high purity zinc chloride and a residue substantially free of chloride. Furfural shows excellent selectivity for this separation, extracting zinc chloride but little or no zinc sulfate or related zinc salts. This is true over the entire temperature range from near the freezing point to near the boiling point of the zinc solution. The degree of extraction is increased by increasing the salt concentration of the solution or by extracting at lower temperatures. Changes in the salt concentration have an appreciable effect on the extraction efficiency of this solvent.

Another advantageous feature of using furfural to effect a separation between the chloride and other anions of zinc is that no extraneous strong electrolyte, such as hydrochloric acid or sulfuric acid, needs to be added to promote or aid the separation.

We have found it practical to remove substantially all the zinc chloride from the zinc solution by furfural extraction at moderate solvent ratios, i. e., approximately 1 to 20 volumes of furfural per volume of zinc solution. We have used other processes such as precipitation or crystallization advantageously in conjunction with our process to obtain economical removal of chloride from zinc salts or mixtures. If it is desired to obtain a greater degree of removal of chloride than is possible with a single extraction, multiple extractions may be used. Reflux of both raffinate and extract may also be used to advantage.

To illustrate the use of our process for removing chloride from other anions of zinc, various aqueous stock solutions of zinc sulfate and zinc chloride were extracted with equal volumes of water saturated furfural, and the results of these extractions are shown in Table 1, wherein the concentrations are expressed as either weight percent or grams per milliliter. The degree of extraction is represented by the distribution coefficient, K, defined as the ratio of the equilibrium concentration of zinc chloride in the solvent phases, the concentration being expressed in grams per milliliter.

The extraction efficiency of furfural for zinc chloride decreases with increasing temperature. The decrease in efficiency is relatively small up to 50° C., but becomes more pronounced at 75° C. and higher. The preferred extraction temperature ranges from about 25° C. to near the boiling point.

Our experimental data show that during an extraction, the aqueous zinc chloride concentration will be reduced by transfer of the solute to the solvent phase, while the concentration of zinc sulfate, which is not transferred, will remain substantially constant.

Since the extraction efficiency, as measured by the distribution coefficient, K, decreases with temperature, a means for offsetting this decrease is to take advantage of the beneficial effect on K of increasing the zinc sulfate or other salt concentration. An increase in the temperature of the solution will displace the saturation barrier and permit a greater concentration of zinc salts to be achieved. Therefore there is an optimum extraction condition where the temperature and concentration effects a balance to give the greatest extraction efficiency.

Zinc sulfate has a tendency to form hydrates. The hydrate systems show metastable solubilities. The hexahydrate of zinc sulfate, for example, produces supersaturated solutions about 50° C. and above, and this offers a means for obtaining the benefits of increased extraction efficiency with increasing concentration of salts.

The preferred embodiment of this process comprises the use of a multiple effect evaporator to produce a supersaturated solution of zinc sulfate. Specifically the amount of evaporation in each effect of the evaporator is controlled to give a thin slurry of zinc sulfate hexahydrate crystals in a saturated solution, the temperature being controlled by adjustment of the pressure in the effect.

The data of R. Rohmer, Compt. Rend., volume 210, page 669 (1940) are specifically referred to for the purpose of defining the temperature-concentration limits of the various stable and metastable zinc sulfate solubility systems, including the hepta-, hexa-, and monohydrate solid phases.

For example, a zinc sulfate solution containing chloride is concentrated in the first effect of the evaporator at about 40–45° C. to give a saturated solution containing about 41–42 percent zinc sulfate by weight. Under these conditions, the solid phase in equilibrium with the solution will be zinc sulfate hexahydrate.

The additional effect or effects of the evaporator are then utilized to obtain a thin slurry of hexahydrate in the hexahydrate metastable solubility region disclosed by Rohmer, i. e., about 49° C. and above, this is the transition temperature for the stable hexahydrate-monohydrate systems of zinc sulfate. It is desirable that solid hexahydrate crystals be present in each stage of the evaporation or concentration to insure the achievement of the high solubility of zinc sulfate possible with the metastable system. Thus a saturated solution at 75° C. in the last effect of the evaporator would contain approximately 49% by weight of zinc sulfate. The slurry removed from the last effect of the evaporator is heated without evaporation to dissolve the remaining hexahydrate and to give a clear supersaturated zinc sulfate solution. This solution is then extracted with furfural to remove chloride. The solute in the furfural extract may be freed of furfural by distillation, evaporation, or back-extraction with water to give substantially pure zinc chloride. If back-extraction with water was used to regenerate the furfural solvent, solvent to aqueous solution ratios may be used greater than the 20 to 1 limits for economical recovery of solvent by distillation.

The raffinate from the furfural extraction is cooled to 38–49° C. to crystallize the zinc sulfate hexahydrate from solution. The crystals of hexahydrate are removed by filtration or other suitable means. The mother liquor from the crystallization may be recycled to the evaporator.

If the desired form of the zinc sulfate be other than the hexahydrate form, it may be obtained by the proper choice of crystallization temperature with or without seeding with the desired hydrate form. For example, if the supersaturated solution, the raffinate of the preferred embodiment, is seeded with monohydrate crystals at a temperature greater than about 49° C., the crystals obtained will be the monohydrate form of zinc sulfate. Likewise, the heptahydrate may be obtained by cooling the raffinate to about 38° C. or lower and seeding with heptahydrate crystals.

We have found a tendency for the furfural to form emulsions in certain salt concentrations during the extraction process. This tendency may be prevented or any emulsion so formed may be destroyed by the addition of a small amount of an acid such as nitric acid to the solution.

Other oxygenated hydrocarbons having 3 to 6 carbon atoms, such as the ethers, ketones, alcohols, aldehydes, and acids are amendable to our process but furfural is the preferred solvent because it contains two oxygenated centers, i. e., the cyclic ether and an aldehyde group.

The preferred embodiment of this invention has been the extraction of supersaturated aqueous solutions of zinc chloride-sulfate mixtures, but unsaturated and saturated solutions may be used also.

When unsaturated solutions of zinc salts are used, it is advantageous to extract with extremely high solvent to solution ratios and then regenerate the solvent by means of back-extraction with water. This process scheme permits the use of high solvent to solution ratios and thus effects a greater separation per extraction.

Furfural is effective when used to leach zinc chloride comminuted solids.

We have disclosed our invention in connection with use of pressures of approximately atmospheric but one skilled in the arts knows that pressure may vary from a vacuum to super-atmospheric and this is our intentions in this specifications and in the claims.

TABLE NO. 1

System of zinc chloride—zinc sulfate—furfural—water

| Run No. | Stock Solution | | Aqueous Phase | | Solvent Phase | | | K |
|---|---|---|---|---|---|---|---|---|
| | $ZnCl_2$ Conc., percent wt. | $ZnSO_4$ Conc., percent wt. | $ZnCl_2$ Conc., g./ml. | $ZnSO_4$ Conc., g./ml. | $ZnCl_2$ Conc., g./ml. | $ZnSO_4$ Conc., g./ml. | | |
| 1 | 2.0 | 5.4 | 0.0189 | 0.0539 | 0.0002 | 0 | | 0.011 |
| 2 | 2.0 | 9.4 | 0.0196 | 0.1021 | 0.0003 | 0 | | 0.014 |
| 3 | 2.0 | 21.4 | 0.0224 | 0.264 | 0.0009 | 0 | | 0.041 |
| 4 | 2.0 | 27.9 | 0.0230 | 0.367 | 0.0019 | 0 | | 0.083 |
| 5 | 2.0 | 37 | 0.0246 | 0.503 | 0.0062 | 0 | | 0.249 |
| 6 | 5.0 | 5.4 | 0.047 | 0.053 | 0.0016 | 0 | | 0.034 |
| 7 | 5.0 | 9.4 | 0.049 | 0.107 | 0.0023 | 0 | | 0.048 |
| 8 | 5.0 | 21.4 | 0.054 | 0.263 | 0.0059 | 0 | | 0.108 |
| 9 | 5.0 | 27.9 | 0.054 | 0.370 | 0.0114 | 0 | | 0.211 |
| 10 | 5.0 | 37 | 0.056 | 0.464 | 0.0232 | 0 | | 0.416 |
| 11 | 10.0 | 9.4 | 0.099 | 0.104 | 0.0104 | 0 | | 0.108 |
| 12 | 10.0 | 37 | 0.089 | 0.455 | 0.0531 | 0 | | 0.596 |
| 13 | 20.0 | 5.4 | 0.187 | 0.061 | 0.0364 | 0 | | 0.196 |
| 14 | 20.0 | 21.4 | 0.183 | 0.281 | 0.0912 | 0 | | 0.498 |
| 15 | 20.0 | 28 | 0.190 | 0.321 | 0.1207 | 0 | | 0.633 |
| 16 | 2.0 | 21.4 | 0.022 | 0.264 | 0.0008 | 0 | | 0.035 |
| 17 | 2.0 | 27.9 | 0.023 | 0.370 | 0.0018 | 0 | | 0.079 |
| 18 | 2.0 | 36.8 | 0.023 | 0.541 | 0.0048 | 0 | | 0.214 |
| 19 | 2.0 | 21.4 | 0.022 | 0.272 | 0.0004 | 0 | | 0.020 |
| 20 | 2.0 | 27.9 | 0.023 | 0.380 | 0.0015 | 0 | | 0.050 |
| 21 | 2.0 | 36.8 | 0.024 | 0.558 | 0.0337 | 0 | | 0.141 |

Runs 1–15 were made at 25° C.; runs 16–18 were made at 50° C.; and runs 19–21 were made at 75° C.

Having fully disclosed our invention, we desire to claim:

1. A process for obtaining substantially pure zinc sulfate monohydrate comprising obtaining a highly concentrated aqueous solution of zinc sulfate containing chloride impurities, extracting said solution with furfural to remove said zinc chloride impurities, and seeding the raffinate with zinc sulfate monohydrate crystals at a temperature above 49° C. to effect crystallization of the zinc sulfate as the monohydrate.

2. A process for separating zinc chloride from an aqueous solution containing zinc chloride and an appreciable concentration of zinc sulfate comprising contacting the aqueous zinc solution with sufficient furfural to give a second liquid phase and separating the phases to obtain an extract rich in zinc chloride and a raffinate lean in zinc chloride.

3. The process of claim 2 wherein at least a part of the furfural is reclaimed and recycled to the contact step.

4. The process of claim 3 wherein the zinc sulfate concentration is at least 5.4% by weight.

5. The process of claim 4 wherein the volume ratio of furfural to solution is at least about 1 and the zinc chloride is reclaimed from the furfural extract by extraction with water.

6. A process for obtaining substantially pure zinc chloride comprising contacting an aqueous zinc solution containing zinc chloride and at least about 5% by weight of zinc sulfate with sufficient furfural at ambient temperature to a temperature no greater than 75° C. and to form two liquid phases and separating the resulting phases to obtain an extract rich in zinc chloride and a raffinate lean in zinc chloride.

7. The process of claim 6 wherein at least part of the furfural is recovered and recycled to the contacting step.

8. The process of claim 6 wherein the extract is contacted with water to re-extract the zinc chloride into a water phase and thus regenerate the furfural.

9. The process of claim 8 wherein the zinc chloride is obtained as a dry solid by vaporizing away the water from the substantially pure zinc chloride solution obtained by re-extraction.

10. A process for effecting the removal of zinc chloride from an aqueous solution to give an aqueous solution containing zinc sulfate but which is substantially free of chloride anions comprising producing an aqueous solution containing a very high concentration of zinc sulfate, contacting said solution with at least sufficient furfural to give two liquid phases, separating the liquid phases to obtain an extract and a raffinate, treating the extract with water to remove the furfural from the zinc chloride to give substantially pure zinc chloride and furfural ready to be recycled to the contact step, treating the raffinate by cooling the raffinate below 38° C. before effecting the crystallization of the zinc sulfate and then crystallizing the zinc sulfate from solution as the heptahydrate and separating the substantially pure zinc sulfate heptahydrate crystals from the mother liquor to obtain zinc sulfate substantially free of chloride anions.

11. The process of claim 10 wherein the raffinate solution is seeded with zinc sulfate heptahydrate after the solution is cooled.

12. A process for separating zinc chloride from an aqueous zinc solution containing zinc chloride and an appreciable concentration of zinc sulfate comprising contacting the aqueous zinc solution with sufficient furfural to give a second liquid phase, maintaining sufficient free mineral acid to enhance the degree of phase separation and then separating the phases to obtain an extract rich in zinc chloride and a raffinate lean in zinc chloride.

13. A process for removing zinc chloride from an aqueous solution comprising contacting the aqueous solution containing zinc chloride and at least about 5% and up to the saturation amount of zinc sulfate with furfural at a temperature less than the boiling point of the solution at the imposed pressure and separating the phases to obtain an extract rich in zinc chloride and a raffinate lean in zinc chloride.

14. A process for reducing the chloride content of an aqueous zinc solution comprising contacting an aqueous zinc solution containing from about 2 to 50% by weight of zinc chloride and from about 5% up to the saturation amount of zinc sulfate with sufficient furfural to cause two liquid phases to form and separating the phases to obtain an extract rich in zinc chloride and a raffinate lean in zinc chloride.

15. The process of claim 14 wherein the extract is re-contacted with water to regenerate the solvent and the zinc chloride is recovered from the contact water solution by vaporization of the water.

16. A process for obtaining substantially pure zinc sulfate hexahydrate from zinc sulfate containing some chloride comprising producing a highly concentrated aqueous solution of zinc sulfate containing chloride, extracting said solution with furfural to obtain a raffinate lean in zinc chloride, concentrating the raffinate to obtain an aqueous solution containing at least 41 percent by weight of zinc sulfate, crystallizing zinc sulfate hexahydrate from the concentrate which is free of undissolved zinc sulfate at the beginning of the crystallization step while the concentrate is maintained at a temperature of at least 38° C. and no greater than 49° C. and separating the zinc sulfate hexahydrate crystals from the aqueous phase.

References Cited in the file of this patent

Werning et al.: "Industrial and Engineering Chemistry," vol. 46, No. 4, April 1954, pages 644–652.

Trimble: "Industrial and Engineering Chemistry," vol. 33, No. 5, May 1941, pages 660–662.

Mellor: "Comprehensive Treatise on Inorganic and Theoretical Chemistry," vol. 1, page 451; vol. 4, page 614; Longmans Green & Co.; New York, N. Y., 1922–23.

"A Dictionary of Chemical Solubilities," Inorganic, by Comey and Hahn, 1921 ed., The MacMillan Co., New York, page 1121.

"The Baker Catalog," July 1951, page 245.